United States Patent [19]

Asano

[11] Patent Number: 5,528,609
[45] Date of Patent: Jun. 18, 1996

[54] METHOD AND APPARATUS FOR CORRECTING PHASE OF FRAMES IN SUBSCRIBER LOOP CARRIER SYSTEM

[75] Inventor: Hiroyuki Asano, Kawasaki, Japan

[73] Assignee: Fujitsu Limited, Kanagawa, Japan

[21] Appl. No.: 189,408

[22] Filed: Jan. 31, 1994

[30] Foreign Application Priority Data

Sep. 8, 1993 [JP] Japan .................... 5-223224

[51] Int. Cl.⁶ .................... G06F 11/00; H04L 12/00
[52] U.S. Cl. .................... 371/47.1; 370/105.3
[58] Field of Search .................... 371/47.1, 5.4; 375/106, 108, 111, 116, 105, 356; 369/83; 370/95, 103, 105.3, 102

[56] References Cited

U.S. PATENT DOCUMENTS

| | | | |
|---|---|---|---|
| 3,562,432 | 2/1971 | Gabbard | 179/15 |
| 3,980,835 | 9/1976 | Mitchell et al. | 170/105.3 |
| 4,653,049 | 3/1987 | Shinmyo | 370/95 |
| 5,091,899 | 2/1992 | Adachi et al. | 369/83 |
| 5,140,616 | 8/1992 | Renner | 375/356 |
| 5,258,980 | 11/1993 | Maebara et al. | 370/95.1 |
| 5,259,004 | 11/1993 | Nakayama | 375/106 |

FOREIGN PATENT DOCUMENTS

| | | |
|---|---|---|
| 57-168545 | 10/1981 | Japan . |
| 1577331 | 10/1980 | United Kingdom . |

*Primary Examiner*—Robert W. Beausoliel, Jr.
*Assistant Examiner*—Ly V. Hua

[57] ABSTRACT

Disclosed is a subscriber loop carrier system wherein, to synchronize the phases of frames and multiframes from a plurality of subscriber loop carriers, corrections are made on the phases of frames and multiframes without relying on memory storage. The phase difference of the frame and multiframe phases with respect to a reference phase is detected at the receiving end. The detected phase difference is transmitted from the receiving end to the transmitting end. At the transmitting end, the phases of frames and multiframes being formed are controlled on the basis of the detected phase difference.

8 Claims, 8 Drawing Sheets

METHOD AND APPARATUS FOR CORRECTING PHASE OF FRAMES IN SUBSCRIBER LOOP CARRIER SYSTEM

BACKGROUND OF THE INVENTION

1. Field of the Invention

The present invention relates to a method and apparatus for correcting the phase of transmitted data frames, and more particularly to a method and apparatus for correcting the phase of frames/multiframes transmitted over incoming lines in subscriber loop carrier systems.

2. Description of the Related Art

Subscriber loop carrier systems have been employed to accommodate subscribers, at geographically remote locations from switching offices, economically and with high transmission quality, and also to alleviate the problem of the ever increasing number of telephone cables in urban areas. In conventional subscriber loop carrier systems, a plurality of subscriber lines are multiplexed as PCM data with a frame/multiframe structure at a remote terminal (RT), and the thus multiplexed PCM data are then transmitted over a fiber optic or other transmission medium to a central office terminal (COT), where the data are demultiplexed into a plurality of subscriber lines for connection to switching equipment. Furthermore, in recent years, high-order multiplexing has come to be adopted wherein a plurality of multiplexed data, instead of undergoing demultiplexing at a COT, are further multiplexed into a high-level multiplexed signal, for direct connection to a switching network such as SONET. To achieve this, a multiplexer for remultiplexing a plurality of multiplexed data is provided with a time slot interchanger (TSI) for interchanging time slots to accomplish dynamic rearrangement on a user-by-user basis. The TSI is provided to accommodate a larger number of subscriber lines than the number of channels in a multiplexed transmission path. To facilitate the interchanging of time slots in the TSI, the phases of the frames/multiframes of the PCM data transmitted over different transmission paths from different RTs must be corrected to achieve synchronization. In the prior art, this phase correction is done by storing the data in memory at the receiving end. This requires the provision of a memory for storing the data, and furthermore, transmission delays are caused because of temporarily storing the data.

If the differences between transmission delay times from the different RTs are within one-frame period, the phase correction is only necessary for the frame, but no phase correction is needed for the multiframe. In this case, a memory that can store one frame of data will suffice for the purpose, and the transmission delay can be kept within one frame period. On the other hand, if the differences between transmission delay times from the different RTs are larger than one frame period, the phase correction must be done not only for the frame but for the multiframe that typically consists of 12 frames. In such a case, the memory capacity required will be much larger, and significant transmission delays will result. Furthermore, in order to use a single fiber optic cable for carrying both the incoming and outgoing lines, the adoption of a time compression multiplexing (TCM) system is considered. If the TCM system is adopted, phase correction for the multiframe becomes essential.

SUMMARY OF THE INVENTION

It is an object of the present invention to provide a method and apparatus for phase correction in subscriber loop carrier systems, whereby phase correction can be done for frames and multiframes without relying on memory storage.

According to the present invention, there is provided a frame phase correction method for correcting the phase of data frames at a receiving end for the data transmitted to the receiving end from a transmitting end, comprising the steps of: detecting a phase difference between the phase of received frames and a reference phase at the receiving end; transmitting the detected frame phase difference to the transmitting side; and controlling the phase of frames being formed at the transmitting end on the basis of said frame phase difference.

According to the present invention, there is also provided a frame phase correcting apparatus for correcting the phase of data frames at a receiving end for the data transmitted to the receiving end from a transmitting end, comprising: means for detecting a phase difference between the phase of received frames and a reference phase at the receiving end; means for transmitting the frame phase difference detected by the frame phase difference detecting means to the transmitting end; and means for controlling the phase of frames being formed at the transmitting end on the basis of said frame phase difference.

DESCRIPTION OF THE PREFERRED EMBODIMENTS

Figure 1:
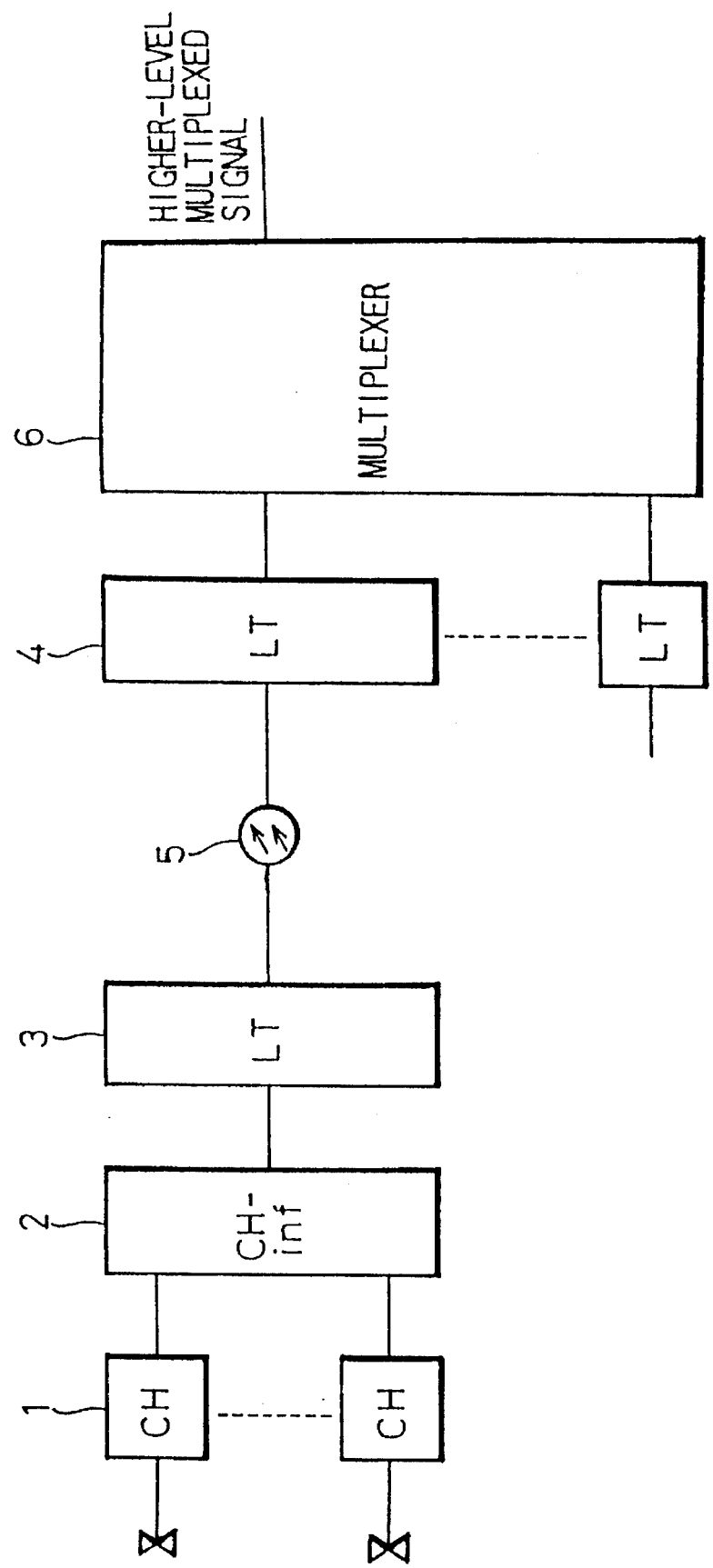
FIG. 1 is a block diagram showing the basic configuration of a subscriber loop carrier system in which the present invention is embodied.

FIG. 1 is a diagram showing the basic configuration of a subscriber loop carrier system in which the present invention is embodied; the overall configuration of the system is shown here in a simplified form. In the figure, the numeral 1 designates a subscriber interface (CH), provided for each subscriber, and via which an analog signal from the subscriber (telephone) side is converted to a PCM signal for transmission over each individual channel and vice versa. A low-order channel interface (CH inf) 2 is provided via which PCM signals from the individual channels are multiplexed into or demultiplexed from a multiframe signal. Line terminations (LT) 3 and 4 each perform conversion between a multiplexed signal and a signal transmitted or for transmission over an optical or metallic transmission path 5. A multiplexer 6 converts the multiplexed signals into a higher-level multiplexed signal for connection to a switching network and vice versa.

Figure 2:
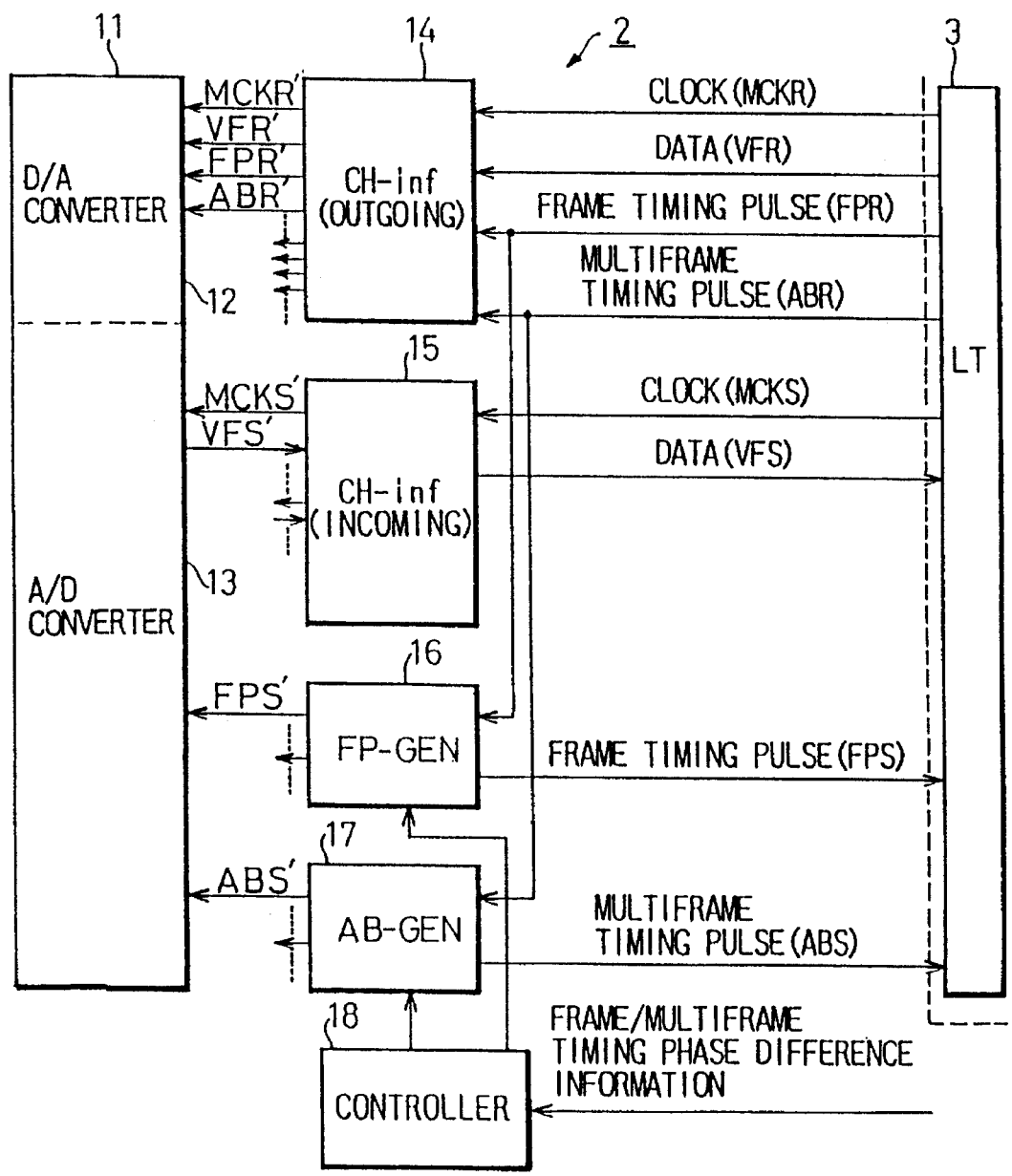
FIG. 2 is a block diagram showing the configuration of a low-order channel interface according to one embodiment of the present invention.

FIG. 2 is a diagram showing the configuration of a low-order channel interface according to one embodiment of the invention. The same parts as those shown in FIG. 1 are designated by the same numerals. In the low-order channel interface 2, the numeral 11 is a codec which consists of a digital-to-analog (D/A) converter 12 for converting PCM signals into analog signals, and an analog-to-digital (A/D) converter 13 for converting analog signals into PCM signals.

A channel interface converter (CH-inf) 14 for outgoing lines separates multiframe-structured data (VFR) transferred from the LT 3 into PCM signals for individual channels by using a clock (MCKR), frame timing pulse (FPR), and multiframe timing pulse (ABR), and transfers data (VFR') to the respective D/A converter units 12 together with a clock (MCKR'), frame timing pulse (FPR'), and multiframe timing pulse (ABR').

A channel interface converter (CH-inf) 15 for incoming lines supplies a clock (MCKS') to the A/D converter 13 for each channel in response to a clock (MCKS) fed from the LT 3, and multiplexes data (VFS'), i.e., PCM signals supplied from the A/D converter 13 in synchronism with the clock (MCKS'), into frame/multiframe-structured data (VFS) which is transferred to the LT 3.

A frame timing generator (FP-GEN) 16 performs phase correction on the frame timing pulse (FPR) fed from the LT 3 by using frame timing phase difference information supplied from a controller 18, and produces outputs, one being supplied to the LT 3 as a frame timing pulse (FPS) and the other supplied to the A/D converter 13 as a frame timing pulse (FPS') for each channel.

A multiframe timing generator (AB-GEN) 17 performs phase correction on the multiframe timing pulse (ABR) fed from the LT 3 by using multiframe timing phase difference information supplied from the controller 18, and produces outputs, one being supplied to the LT 3 as a multiframe timing pulse (ABS) and the other supplied to the A/D converter 13 as a multiframe timing pulse (ABS') for each channel.

Figure 3:
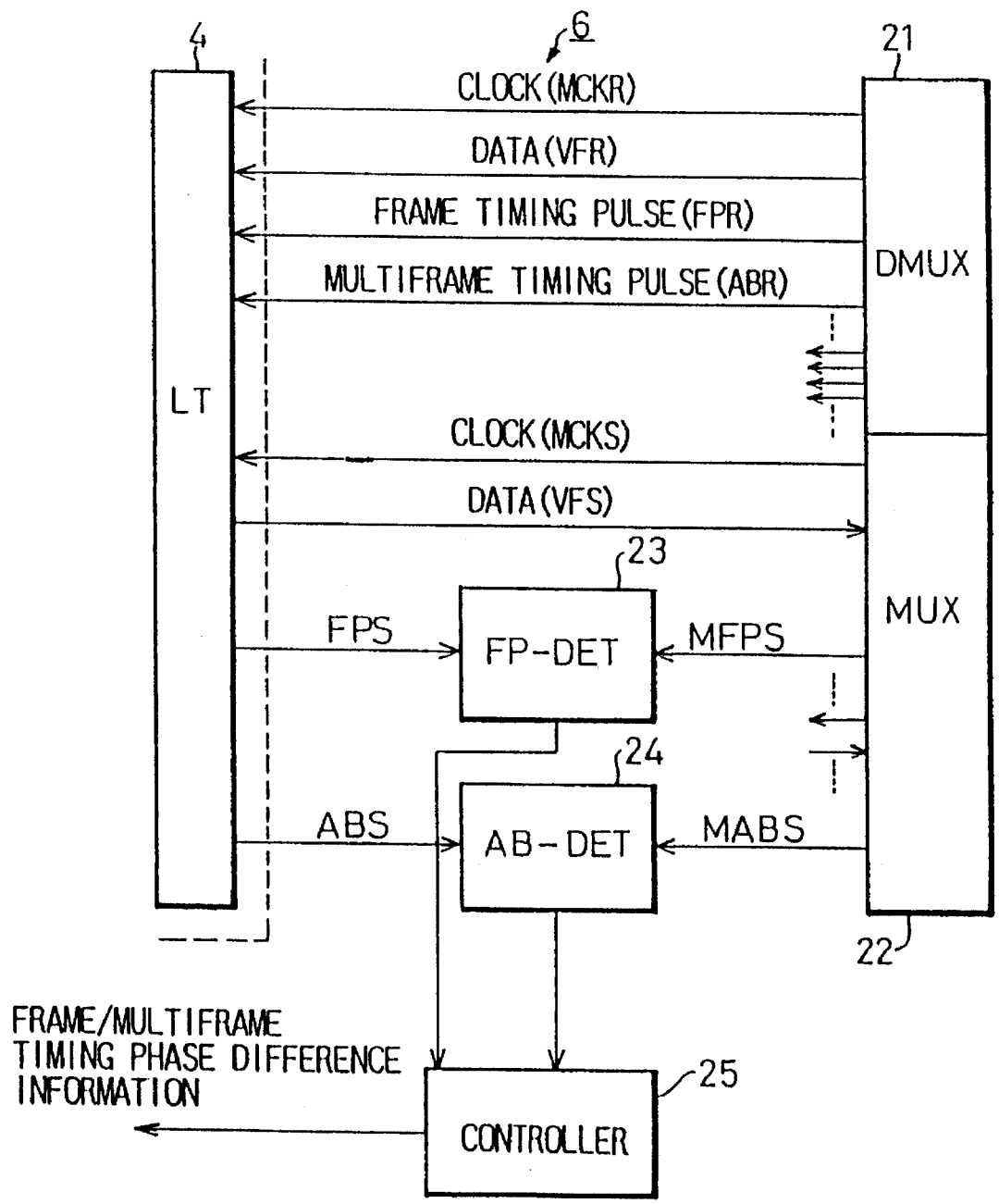
FIG. 3 is a block diagram showing the configuration of a multiplexer according to one embodiment of the present invention.

The controller 18 supplies the frame timing phase difference information to the FP-GEN 16 and the multiframe phase difference information to the AB-GEN 17 in accordance with frame/multiframe timing phase difference information supplied from the multiplexer 6 (FIG. 3).

FIG. 3 is a diagram showing the configuration of a multiplexer according to one embodiment of the invention, wherein the same parts as those shown in FIG. 1 are designated by the same numerals. The multiplexer 6 consists of a demultiplexing unit (DMUX) 21 for demultiplexing a higher-level multiplexed signal, and a multiplexing unit (MUX) 22 for multiplexing lower-level multiplexed signals into a higher-level multiplexed signal. The DMUX 21 demultiplexes the higher-level multiplexed signal and distributes each of the demultiplexed multiframe data (VFR) to the LT 4 together with a clock (MCKR), frame timing pulse (FPR), and multiframe timing pulse (ABR).

The MUX 22 sends a clock (MCKS) to the LT 4 and multiplexes data (VFS) from the LT 4 into a higher-level multiplexed signal for transmission to higher-order equipment.

A frame phase difference detector (FP-DET) 23 compares a frame timing pulse (MFPS) fed from the MUX 22 with a frame timing pulse (FPS) fed from the LT 4, and produces frame timing phase difference information. A multiframe phase difference detector (AB-DET) 24 compares a multiframe timing pulse (MABS) fed from the MUX 22 with a multiframe timing pulse (ABS) fed from the LT 4, and produces multiframe timing phase difference information.

A controller 25 transmits the frame timing phase difference information from the FP-DET 23 and the multiframe timing phase difference information from the AB-DET 24 to the controller 18 (FIG. 2) in the low-order channel interface 2.

Thus, according to the invention, the frame phase difference and the multiframe phase difference occurring between the MUX 22 and the LT 4 are detected in the multiplexer 6, and the detected information is transmitted to the low-order channel interface 2, where, based on this information, the phase differences of the frame timing and multiframe timing pulses between the A/D converter 13 and the LT 3 are corrected, compensating for differences in delay time between LT 3 and LT 4 and thus reducing the phase differences of the frame and multiframe signals, respectively, to zero.

Figure 4:
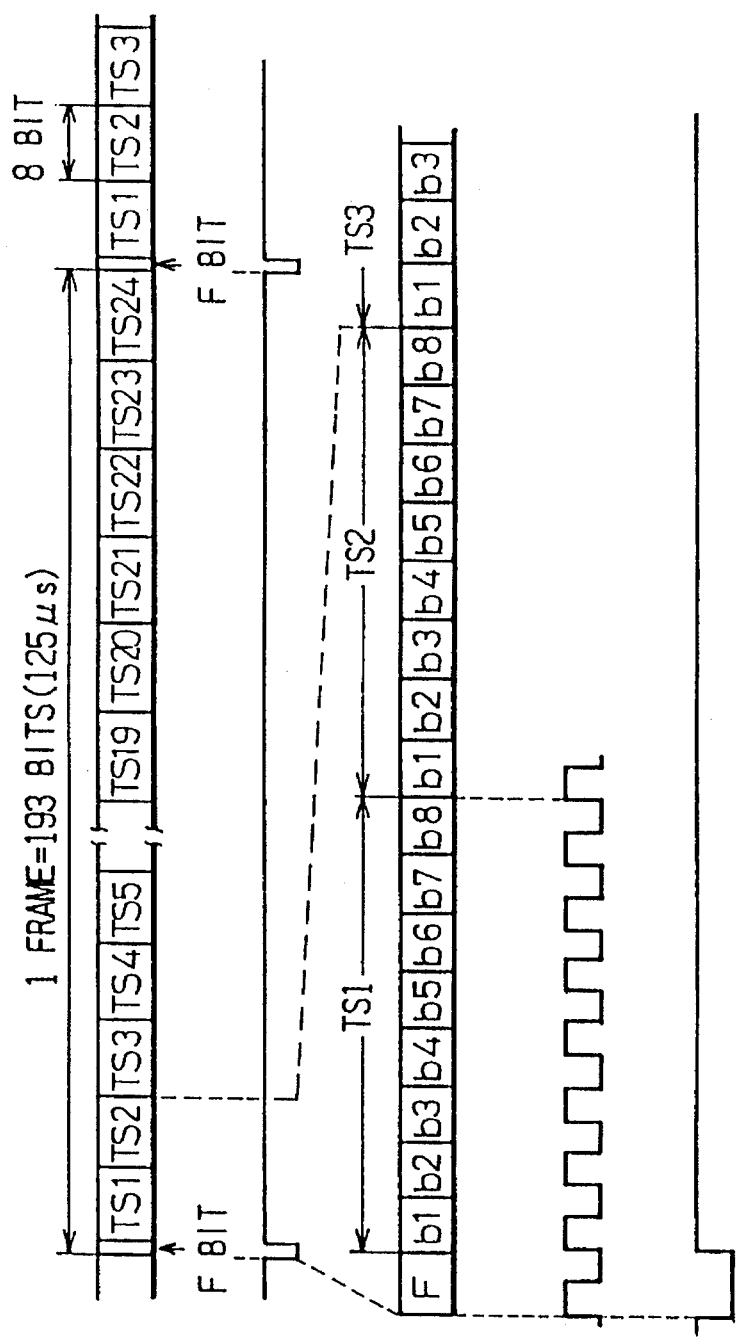
FIG. 4 is a diagram showing the timing for various signals in association with a frame structure.

FIG. 4 shows the timing for the various signals in association with the frame structure. In the example shown, one frame consists of 24 time slots (TS), but this is only illustrative and not restrictive.

In the figure, VFS/R indicates frame-structured data for incoming and outgoing lines. TS1 to TS24 are time slots; each TS consists of 8-bit data, b1 to b8, and a 1-bit framing bit (F) is added at the beginning of the frame, so that each frame consists of a total of 193 bits (in 125 µs).

FPS/R is a frame timing pulse for incoming and outgoing lines, MFPS is a frame timing pulse output from the multiplexer 6, and MCKS/R is a clock signal for incoming and outgoing lines.

Figure 5:
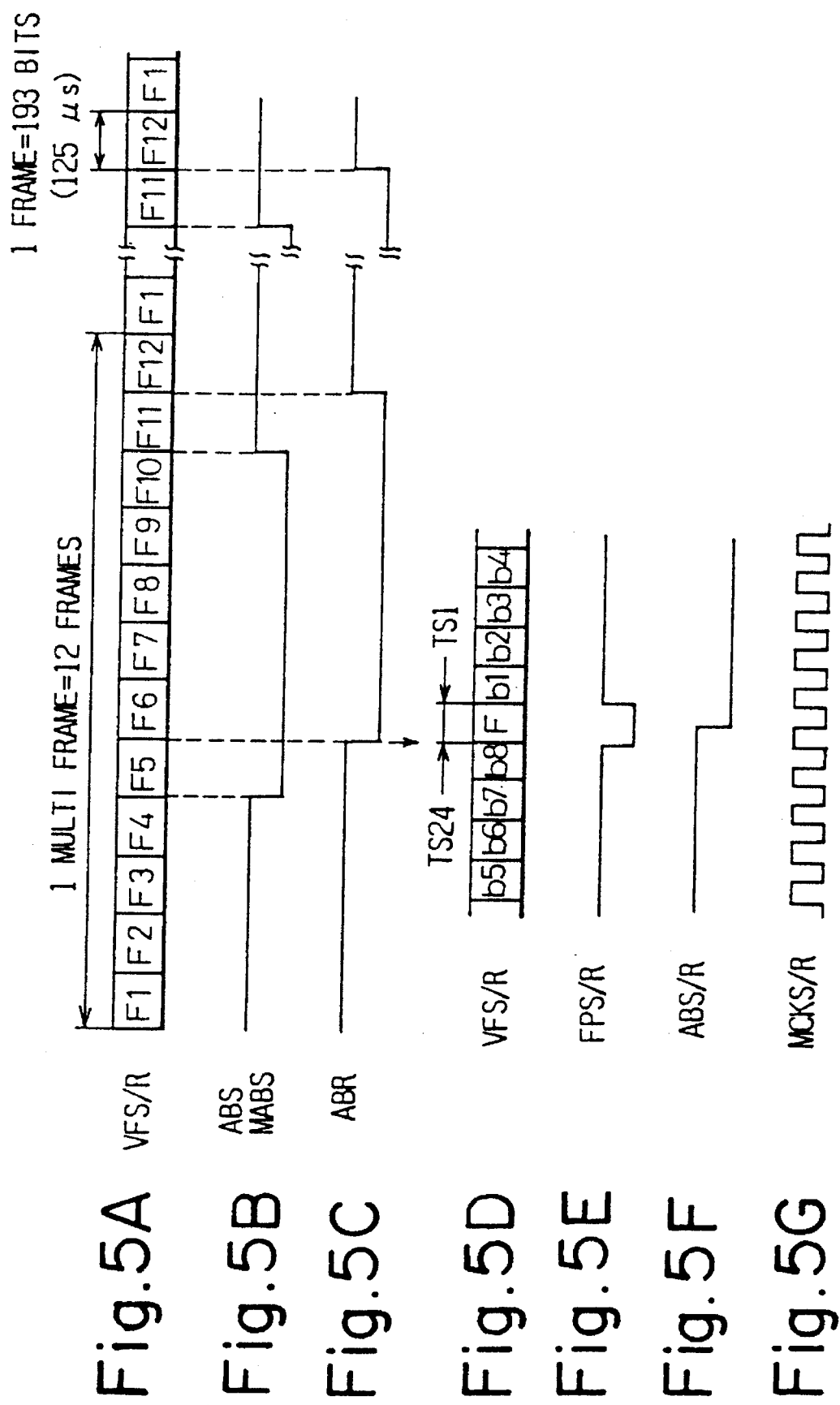
FIG. 5 is a diagram showing the timing for various signals in association with a multiframe structure.

FIG. 5 shows the timing of the various signals in association with the multiframe structure. In the example shown, one multiframe consists of 12 frames, but this is only illustrative and not restrictive.

In the figure, VFS/R indicates multiframe-structured data for incoming and outgoing lines. F1 to F12 are frames each corresponding to the 193-bit frame illustrated in FIG. 4.

ABS is a multiframe timing pulse for incoming lines, MABS is a multiframe timing pulse output from the multiplexer 6, ABR is a multiframe timing pulse for outgoing lines, FPS/R is a frame timing pulse for incoming and outgoing lines, and MCKS/R is a clock signal for incoming and outgoing lines.

Figure 6:
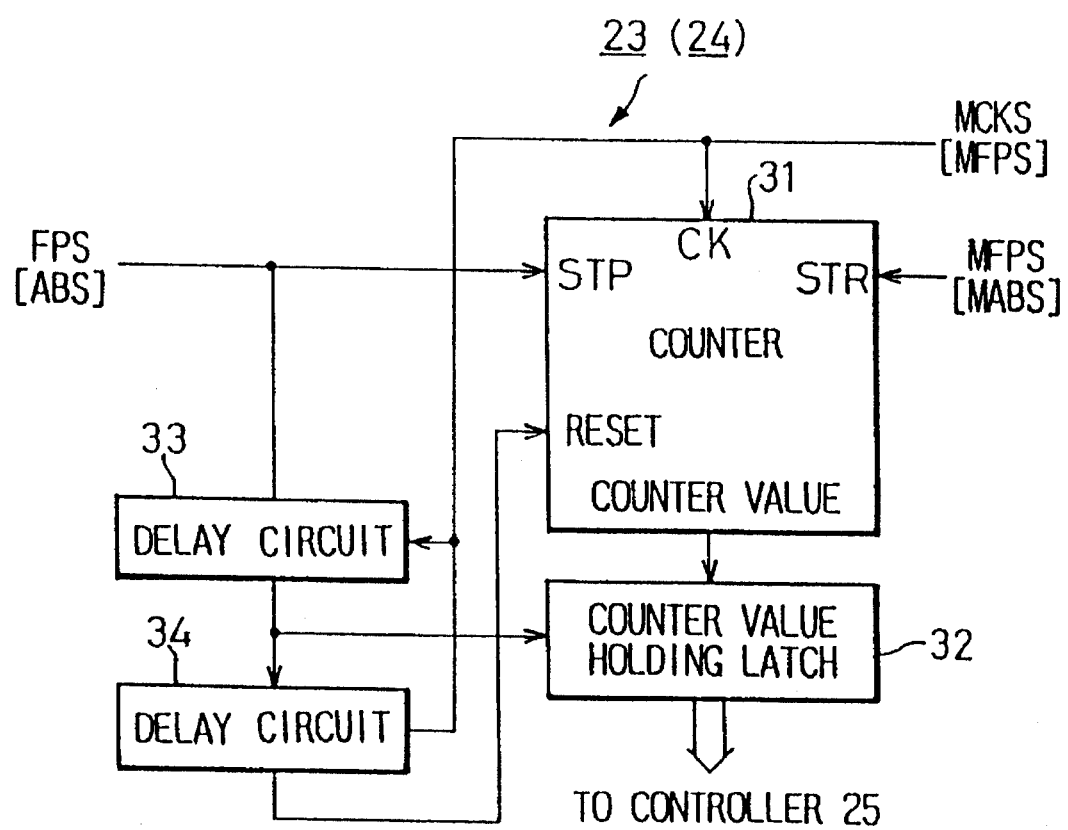
FIG. 6 is a circuit block diagram showing a configurational example of a frame or multiframe phase difference detector.

FIG. 6 is a circuit block diagram showing a configurational example of the frame phase difference detector (or multiframe phase difference detector). These detectors can be easily implemented using relatively simple logic circuits. In the figure, the signals associated with the multiframe phase difference detector 24 are shown in square brackets along with the corresponding signals associated with the frame phase difference detector 23.

In the frame phase difference detector 23 or the multiframe phase difference detector 24, the numeral 31 indicates a counter which counts the number of clock pulses (MCKS) or frame timing pulses (MFPS), starting from the pulse position of the frame timing pulse (MFPS) or multiframe timing pulse (MABS) applied at a start signal input (STR) from the MUX 22 and ending at the pulse position of the frame timing pulse (FPS) or multiframe timing pulse (ABS) applied at a stop signal input (STP) from the LT 4. The resulting counter value is latched into a counter value holding latch 32 before transfer to the controller 25. Delay circuits 33 and 34 are provided which delay the frame timing pulse (FPS) or multiframe timing pulse (MFPS) in accordance with the clock (MCKS) or frame timing pulse (MFPS), and which produce a latch timing signal for the counter value holding latch 32 and a reset signal for the counter 31, respectively.

In the example shown in FIG. 6, the counter 31 is started by the application of MFPS or MABS, and stopped by the application of FPS or ABS, upon which the counter value is read out. It will be appreciated, however, that the counter value may also be read out by starting the counting upon FPS or ABS and stopping it upon MFPS or MABS.

Figure 7:
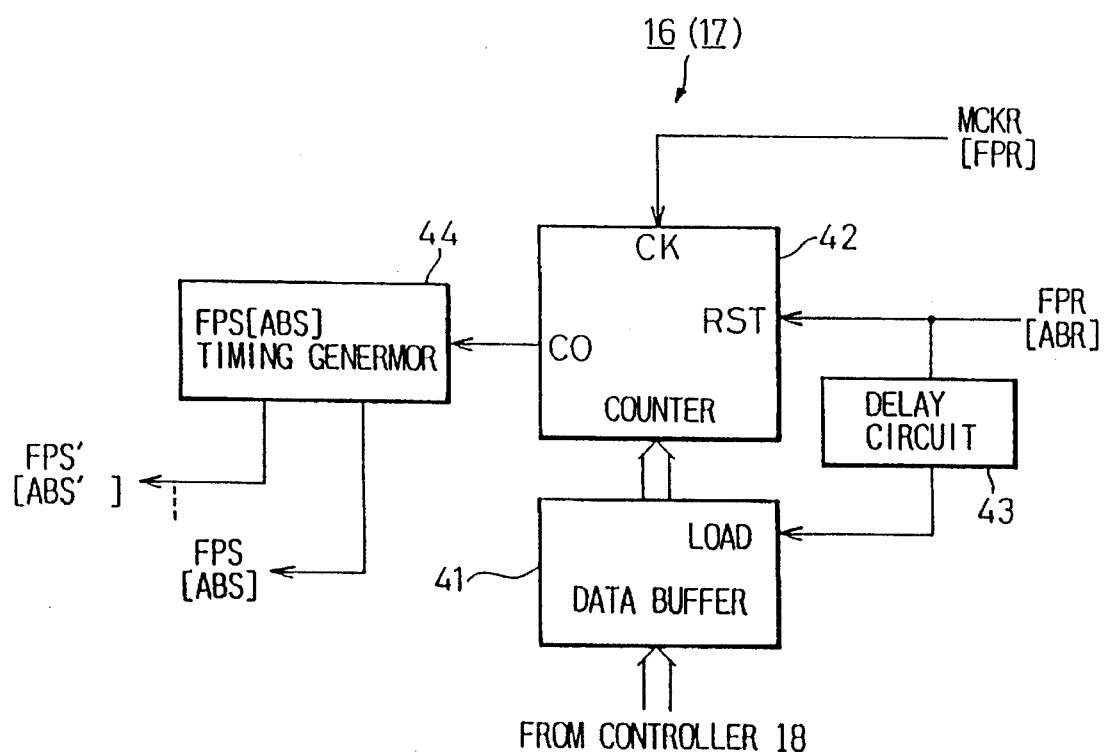
FIG. 7 is a circuit block diagram showing a configurational example of a frame or multiframe timing generator.

FIG. 7 is a circuit block diagram showing a configurational example of the frame timing generator (multiframe timing generator). These generators also can be easily implemented using relatively simple logic circuits. In the figure, the signals associated with the multiframe timing generator 17 are shown in square brackets along with the corresponding signals associated with the frame timing generator 16.

In the frame timing generator 16 or the multiframe timing generator 17, the numeral 41 indicates a data buffer where the phase correction data from the controller 18 is stored. A counter 42 is reset by the frame timing pulse (FPR) or multiframe timing pulse (ABR) applied from the LT 3, and counts the number of clock pulses (MCKR) or frame timing pulses (FPR) by a period equal to the phase correction data written in the data buffer 41. When the counting is completed, a signal is output from a carry signal output (CO) whereby an FPS [ABS] timing generator 44 is driven to generate frame timing pulses (FPS, FPS') or multiframe timing pulses (ABS, ABS').

A delay circuit 43 delays FPR or ABR and supplies the resulting output to the data buffer 41 as a loading signal by which the phase correction data is written into the data buffer 41 immediately after the resetting of the counter 42. At the completion of the counting by the counter 42, the FPS [ABS] timing generator 44 generates the frame timing pulses (FPS, FPS') or the multiframe timing pulses (ABS, ABS').

Figure 8:
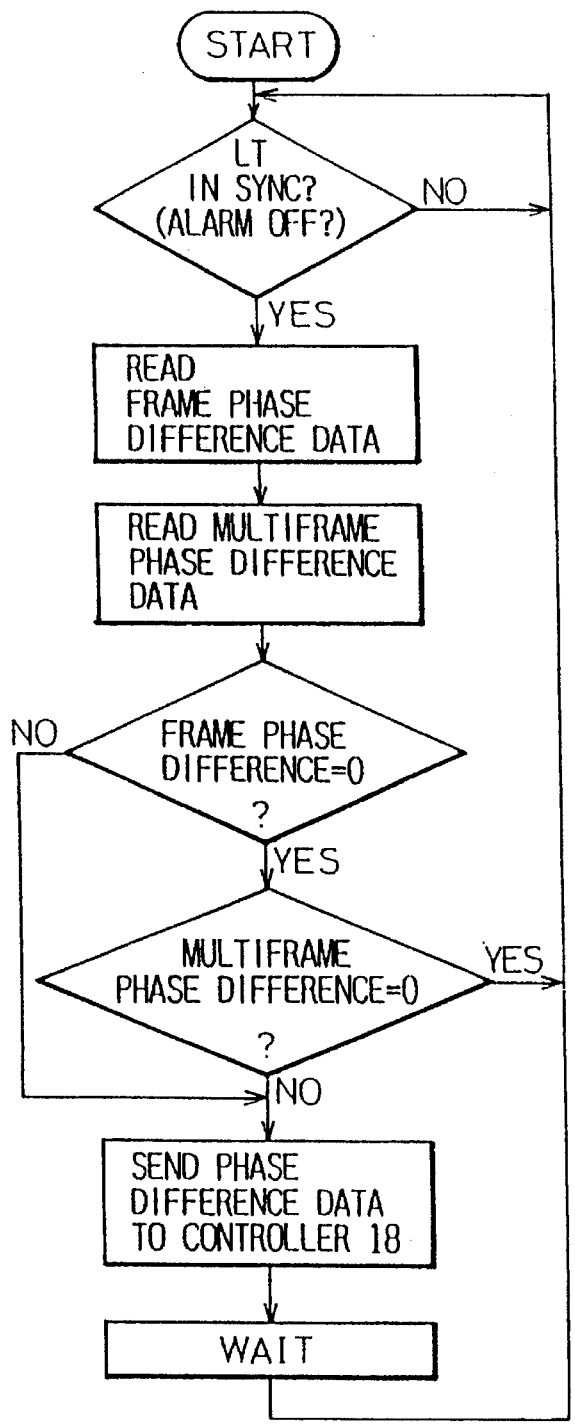
FIGS. 8 and 9 are flowcharts for controllers.
Figure 9:
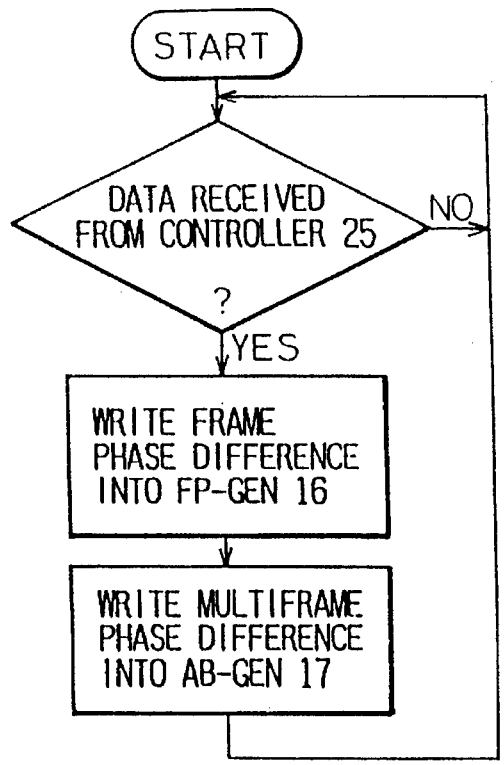

FIGS. 8 and 9 are flowcharts illustrating the operations of the controllers: FIG. 8 for the controller 25 and FIG. 9 for the controller 18. Referring to FIG. 8, when the line termination (LT) is in synchronization and no alarm is issued, the controller 25 reads the frame phase difference data and multiframe phase difference data from the frame phase difference detector 23 and multiframe phase difference detector 24, respectively, and transmits the phase difference data to the controller 18 if the frame phase difference or multiframe phase difference is not zero. Then, after waiting for a prescribed time, the operation returns to the beginning of the control process. The prescribed waiting time is inserted to perform the control in an intermittent manner.

Referring to FIG. 9, when the phase difference data is received from the controller 25, the controller 18 writes the frame phase difference data into the frame timing generator 16 and the multiframe phase difference data into the multiframe timing generator 17.

In this embodiment, the processing in the controllers 18 and 25 is implemented in software, but since the processing is relatively simple, it can also be easily implemented in hardware using logic circuits.

Communication between the controllers 18 and 25 is accomplished, for example, by using overhead bits appended to the data transmitted between the LT 3 and LT 4.

I claim:

1. A frame phase correction method for correcting the phase of data frames at a receiving end for the data transmitted to the receiving end from a transmitting end, comprising the steps of:

a) detecting a frame phase difference between the phase of received frames and a first reception reference phase at the receiving end;

b) transmitting the detected frame phase difference to the transmitting end; and c) controlling the phase of frames to be formed at the transmitting end on the basis of said frame phase difference, to thereby correct the phase difference of data frames, wherein said step a) includes the substeps of starting a first counter by one of signals representing said first reception reference phase and said phase of said received frames, and reading a counter value from said first counter in response to the other one of the signals representing said first reception reference phase and said phase of said received frames, said counter value providing an indication of said frame phase difference, and said step c) includes the substeps of loading said counter value into a second counter in response to a signal representing a first transmission reference phase, and determining the phase of the frames to be formed in accordance with a count end signal output from said second counter.

2. A method according to claim 1, wherein a prescribed number of successive frames are grouped together to form a multiframe, further comprising the steps of:

d) detecting a multiframe phase difference between the phase of received multiframes and a second reception reference phase at the receiving end;

e) transmitting the detected multiframe phase difference to the transmitting end; and f) controlling the phase of multiframes to be formed at the transmitting end on the basis of said multiframe phase difference.

3. A method according to claim 2, wherein said frame phase and said multiframe phase represent the phases of the frames and multiframes, respectively, on incoming lines in a subscriber loop carrier system.

4. A method according to claim 3, wherein said step d) includes the substeps of starting a third counter by one of signals representing said second reception reference phase and said phase of said received multiframes, and reading a counter value from said third counter in response to the other one of the signals representing said second reception reference phase and said phase of said received multiframes, said counter value providing an indication of said multiframe phase difference, and said step f) includes the substeps of loading said counter value into a fourth counter in response to a signal representing second transmission reference phase, and determining the phase of the multiframes to be formed in accordance with a count end signal output from said fourth counter.

5. A frame phase correcting apparatus for correcting the phase of data frames at a receiving end for the data transmitted to the receiving end from a transmitting end, comprising:

first means for detecting a frame phase difference between the phase of received frames and a first reception reference phase at the receiving end;

first means for transmitting the frame phase difference detected by said first detecting means to the transmitting end; and first means for controlling the phase of frames to be formed at the transmitting end on the basis of said frame phase difference, to thereby correct the phase of data frames, wherein said first detecting means includes a first counter which is started by one of signals representing said first reception reference phase and said phase of said received frames, and from which a counter value is read out in response to the other one of the signals representing said first reception reference phase and said phase of said received frames, as said frame phase difference, and said first control means includes a second counter into which said counter value transmitted by the first transmitting means is loaded in response to a signal representing a first transmission reference phase and which outputs a count end signals and a frame timing generating circuit which outputs a signal defining the phase of the frames to be formed, said frame timing generating circuit outputting the signal in accordance with said count end signal.

6. An apparatus according to claim 5, wherein a prescribed number of successive frames are grouped together to form a multiframe, further comprising:

second means for detecting a multiframe phase difference between the phase of received multiframes and a second reception reference phase at the receiving end;

second means for transmitting the multiframe phase difference detected by said second detecting means to the transmitting end; and second means for controlling the phase of multiframes to be formed at the transmitting end on the basis of said multiframe phase difference.

7. An apparatus according to claim 6, wherein said frame phase and said multiframe phase represent the phases of the frames and multiframes, respectively, on incoming lines in a subscriber loop carrier system.

8. An apparatus according to claim 7, wherein said second detecting means includes a third counter which is started by one of signals representing said second reception reference phase and said phase of said received multiframes, and from which a counter value is read out in response to the other one of the signals representing said second reception reference phase and said phase of said received multiframes, and said second control means includes a fourth counter into which said counter value transmitted by the second transmitting means is loaded in response to a signal representing a second transmission reference phase and which outputs a count end signal, and a multiframe timing generating circuit which outputs a signal defining the phase of the multiframes to be formed, said multiframe timing generating circuit outputting the signal in accordance with said count end signal.

* * * * *